May 30, 1961
V. O. DOWDLE
2,985,992
CLUTCH AND BRAKE MECHANISM FOR A
ROTARY-TYPE MOWING MACHINE
Filed Dec. 15, 1958
2 Sheets-Sheet 1
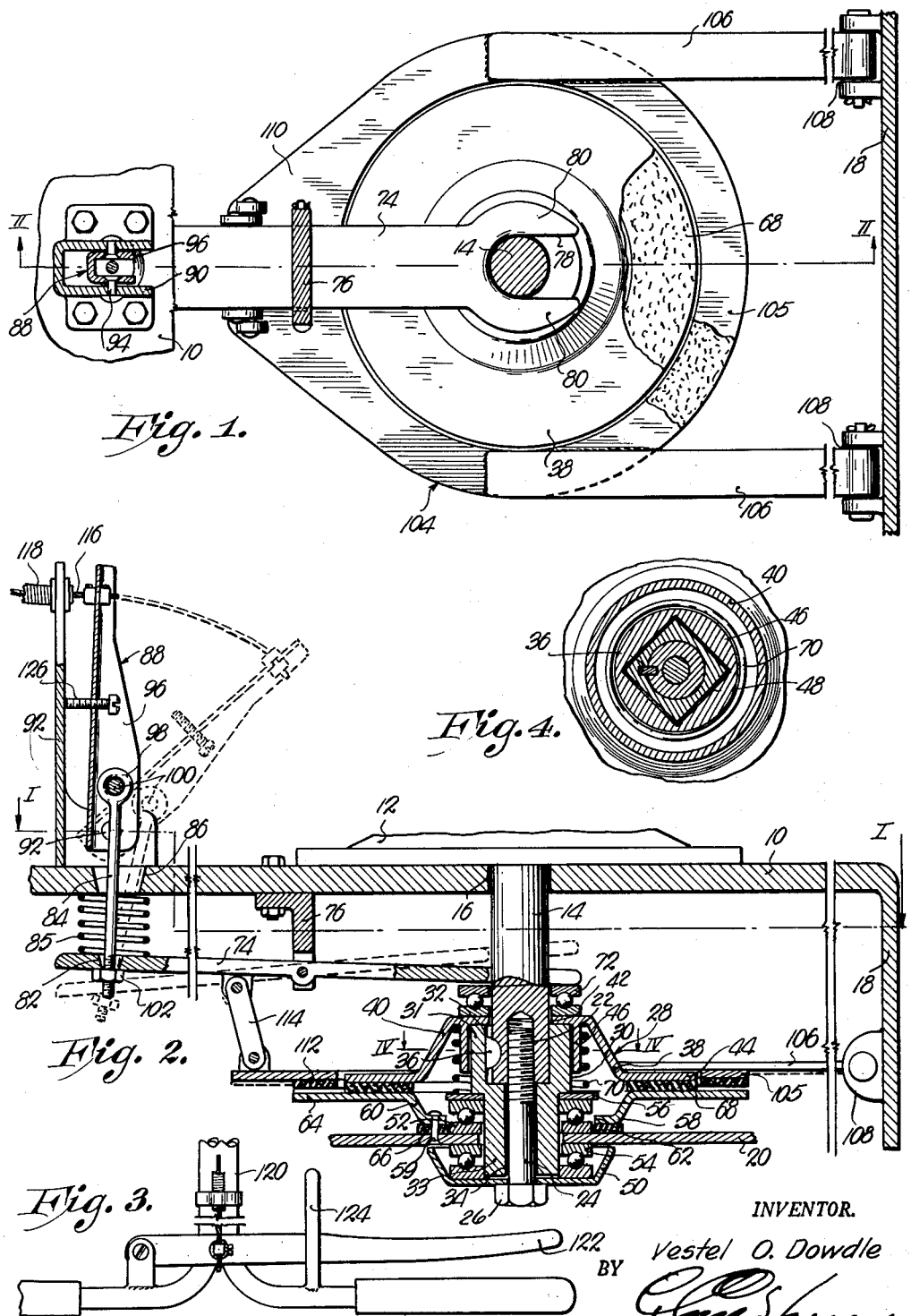
INVENTOR.
Vestel O. Dowdle
BY
ATTORNEY May 30, 1961
V. O. DOWDLE
2,985,992
CLUTCH AND BRAKE MECHANISM FOR A
ROTARY-TYPE MOWING MACHINE
Filed Dec. 15, 1958
2 Sheets-Sheet 2
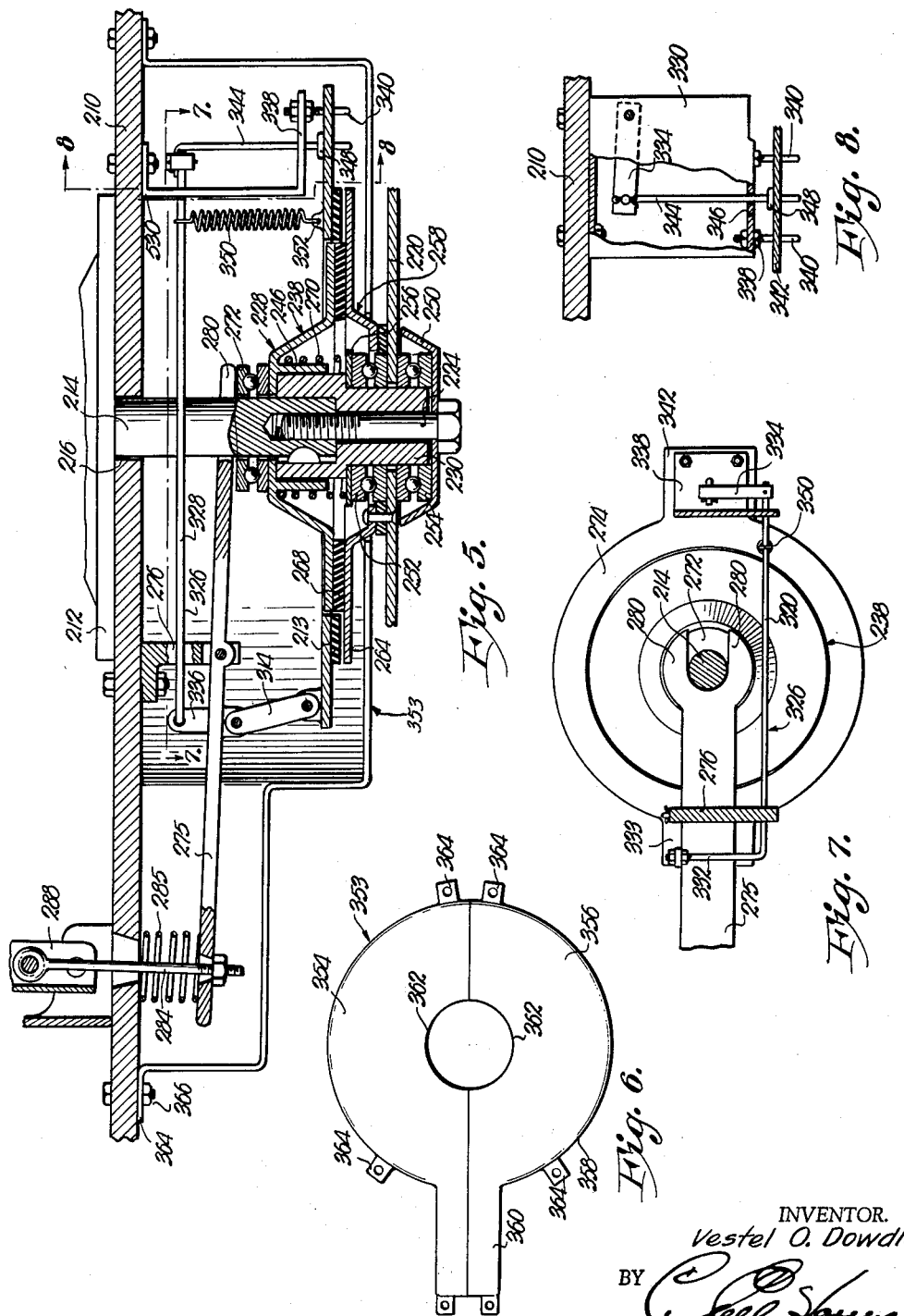
INVENTOR.
Vestel O. Dowdle
BY
ATTORNEY.

United States Patent Office 2,985,992
Patented May 30, 1961

2,985,992
CLUTCH AND BRAKE MECHANISM FOR A ROTARY-TYPE MOWING MACHINE

Vestel O. Dowdle, 6109 Park, Kansas City, Mo.

Filed Dec. 15, 1958, Ser. No. 780,628

11 Claims. (Cl. 56—25.4)

This invention relates to rotary-type mowing machines and more particularly, to an improved clutch and brake mechanism for connecting and disconnecting the mowing blade with the drive shaft of the engine mounted on the machine.

The most important object of this invention is to provide clutch and brake mechanism for rotary-type mowing machines which is constructed in a manner to automatically prevent rotation of the mowing blade upon disengagement of the blade from the drive shaft of the mowing machine engine.

Another important object of the present invention is to provide clutch and brake mechanism as described which comprises clutch structure including relatively shiftable, interengageable elements connected to the drive shaft of the engine and the mowing blade respectively as well as a brake shoe adapted to engage the clutch element connected to the mowing blade, to the end that upon relative movement of the clutch elements away from each other to effect uncoupling of the mowing blade from the drive shaft of the engine, the brake shoe is automatically moved into engagement with the clutch element connected to the mowing blade to thereby prevent rotation of the latter throughout the time the mowing blade is disengaged from the engine drive shaft.

A further important object of the invention is to provide clutch and brake mechanism for rotary-type mowing machines as described wherein there is included control structure connected to the mechanism in a manner so that the same may be actuated from a point remote from the mowing blade.

Other important objects of the invention include the provision of brake and clutch mechanism for rotary-type lawn mowers which is constructed to automatically uncouple the mower blade from the engine drive shaft and stop the blade whenever a control lever on the mower handle is released by the operator of the machine; and the provision of brake and clutch mechanism which is simple in construction, well protected from foreign objects during mowing operations and which may be readily mounted on presently existing rotary mowing machines.

In the drawing:

Figure 1 is a horizontal, cross-sectional view of clutch and brake mechanism for rotary-type lawn mowers constructed in accordance with the concepts of the instant invention, and taken substantially on the irregular line I—I of Fig. 2;

Fig. 2 is a fragmentary, vertical, cross-sectional view taken on the line II—II of Fig. 1;

Fig. 3 is a reduced, fragmentary, plan view of the handle bars for the mowing machine of the instant invention and illustrating a suitable remote control handle for the clutch and brake mechanism;

Fig. 4 is a horizontal, cross-sectional view taken on the line IV—IV of Fig. 2.

Fig. 5 is a horizontal, cross-sectional view of modified clutch and brake mechanism as contemplated by the instant invention and illustrating a shield for the mechanism controlling operation of the cutter blade as well as additional means for shifting the braking unit;

Fig. 6 is a plan view of the shield per se; and

Figs. 7 and 8 are reduced cross-sectional views taken on the lines VII—VII and VIII—VIII respectively of Fig. 5, with certain of the parts of the mechanism illustrated in Fig. 8 being broken away to reveal details of construction thereof.

The clutch and brake mechanism of the present invention is particularly designed for use with rotary-type lawn mowers having a hollow housing 10 receiving a prime mover in the nature of a gasoline engine 12 disposed in an upright position and having a normally vertical drive shaft 14 extending downwardly therefrom through a central opening 16 in housing 10, it being noted that housing 10 is provided with a peripheral, downwardly extending skirt portion 18 which serves as a protective baffle for a mowing blade 20 shown fragmentarily in Fig. 2. The lowermost end of shaft 14 is internally tapped as at 22 in a longitudinal direction to receive an elongated stud bolt 24 which is complementally threaded thereinto. The head 26 of bolt 24 is vertically spaced from the lowermost end of shaft 14 and serves to hold clutch mechanism hereinafter to be described in position on shaft 14.

Clutch structure, broadly designated by the numeral 28, includes an elongated, tubular collar 30 having an upper portion 31 presenting an enlarged, longitudinal bore portion 32 receiving the lowermost end of shaft 14 and a narrower, lower portion 33 presenting a bore 34 receiving the portion of bolt 24 extending downwardly from shaft 14. Collar 30 is secured to shaft 14 by a key 36 extending into the latter and, as clearly shown in Fig. 4, the outer configuration of the upper portion 31 of collar 30 disposed in surrounding relationship to bore 32 is polygonal in transverse cross-section. An upper clutch plate 38 is mounted on collar 30 and, as shown in Fig. 2, plate 38 includes a central, substantially frusto-conical section 40 provided with a central perforation 42 receiving the lowermost end of shaft 14, and an annular, relatively flat, outer flange portion 44 integral with the lower edge of section 40. Plate 38 is also provided with an internal, downwardly extending box 46 which is provided with an internal, polygonal, portion of collar 30, as shown in Fig. 4. The outermost surface of box 46 is substantially cylindrical and is coaxial with shaft 14 and bolt 24.

A centrally perforated, cup-shaped thrust washer 50 is disposed on the lowermost end of stud bolt 24 between the lower end of portion 33 of tubular collar 30 and head 26 of bolt 24. A pair of spaced thrust bearings 52 and 54 are positioned on portion 33 of collar 30 in surrounding relationship to the same and receive mowing blade 20 therebetween. An annular thrust washer 56 is positioned between the upper face of bearing 52 and the shoulder presented by the lower edge of portion 31 of collar 30, while a second clutch plate 58 is positioned beneath plate 38 in a manner to be engageable with the latter. As shown in Fig. 2, plate 58 is provided with a central, frusto-conical portion 60 having an opening 62 of sufficient diameter to clear bearing 52, as well as an outwardly extending, annular margin 64 integral with the peripheral edge of frusto-conical portion 60. As clearly shown in Fig. 2, margin 64 of plate 58 extends outwardly beyond the outer peripheral edge of flange 44 of plate 38 and thereby presents a brake shoe-receiving upper surface.

Semi-rigid material 66 is disposed between blade 20 and clutch plate 58, while an annular member 68 of friction material is secured to the lower face of flange 44 in a position to engage the proximal portion of margin 64 of plate 58. A plurality of rivets 59 extending through blade 20, annular material 66 and portion 60 of plate 58 serve to secure blade 20 to plate 58 and to maintain the same in proper spaced relationship to portion 33 of collar 30. A spring 70 is located within plate 38 in surrounding relationship to boss 46 in a position to engage the upper part of section 40, as well as annular thrust washer 56. A pressure bearing 72 is disposed in overlying relationship to plate 38 and surrounding shaft 14, it being noted that the lowermost section of bearing 72 is adapted to frictionally engage the upper surface of section 40 of plate 38.

Mechanism for shifting plate 38 into engagement with plate 58 against the action of spring 70 includes an elongated arm 74 pivotally mounted intermediate its ends on housing 10 by virtue of bracket 76 secured to the under face of housing 10 and extending downwardly therefrom in parallelism with shaft 14. As shown in Fig. 1, the end of arm 74 adjacent shaft 14 is provided with a longitudinally extending slot 78 presenting a pair of parallel legs 80 embracing shaft 14 and adapted to engage the upper face of bearing 72. The end of arm 74 remote from shaft 14 is provided with a perforation 82 which receives the lowermost end of an elongated connecting bolt 84 in a manner to be described. A coil spring 85 is interposed between the lower face of housing 10 and the end of arm 74 remote from shaft 14 and is disposed in surrounding relationship to bolt 84.

Housing 10 has an opening 86 therein in substantial alignment with perforation 82 in arm 74 for clearing bolt 84. Means for actuating bolt 84 includes a lever 88 which is substantially U-shaped in cross-section and which is pivotally mounted on opposed, parallel legs 90 of an upright bracket 92 suitably secured to the upper face of housing 10. As illustrated in Fig. 1, means for pivotally mounting lever 88 on bracket 92 includes a pair of opposed pivot pins 94 extending from corresponding legs 90 into opposed vertical portions 96 of lever 88, while the uppermost end of bolt 84 provided with an eyelet 98 is disposed between portions 96 of lever 88 and is pivotal with respect thereto by virtue of a pin 100 secured to portions 96 and passing through eyelet 98 thereof. The lowermost end of bolt 84 which extends downwardly through opening 86 of housing 10 and perforation 82 of arm 74 is threaded in a manner to receive a nut 102 disposed beneath and engaging arm 74.

A brake arm broadly designated 104 is provided within housing 10 and includes a substantially annular disc 105 having a pair of parallel legs 106 secured thereto and which are in turn pivotally mounted on skirt 18 of housing 10 as at 108 in a position so that disc 105 lies in a horizontal plane substantially parallel with a plane through flange 44 of plate 38. Disc 105 surrounds clutch structure 28 and substantially overlies margin 64 of plate 58 while projection or bight 110 extends outwardly beyond margin 64 of plate 58. An annular brake shoe 112 of friction material is secured to the lower face of disc 105 in a position to engage margin 64 of plate 58 while means for moving the shoe 112 into engagement with margin 64 includes an elongated link 114 pivotally connected to arm 74 between bracket 76 and bolt 84, as well as to the outermost end of bight 110.

Means for controlling swinging movement of lever 88 through a predetermined arc includes an elongated, flexible cable 116 suitably secured to the normally uppermost end of lever 88 and passing through a cable housing 118 secured at its lowermost end to bracket 92 and at its uppermost end to the handle bar 120 of the mowing machine. As shown in Fig. 3, means for reciprocating cable 116 within housing 118 includes a control handle 122 pivotally mounted on handle bar 120 and swingable within an arc limited by guide 124.

In operation, the present brake and clutch mechanism is especially adapted for disengaging mowing blade 20 from shaft 14 at any time that handle 122 is released while engine 12 continues to rotate shaft 14 and providing for automatic braking of blade 20 immediately upon uncoupling of the latter from shaft 14. It can be seen that when handle 122 is pulled back against the handle bars of the mower, cable 116 moves lever 88 into a substantially upright position, as illustrated in Fig. 2, and bolt 84 is shifted to the uppermost end of its path of travel to consequently swing arm 74 about its pivot point on bracket 76 and thereby move legs 80 of arm 74 into engagement with the uppermost face of bearing 72 disposed in overlying relationship to plate 38. Movement of arm 74 to this position biases plate 38 downwardly against the action of spring 70 to move friction member 68 into engagement with plate 58 and thereby cause blade 20 to be rotated on a vertical axis with shaft 14 which is being rotated under the action of engine 12. It can be seen that because of the fact that collar 30 is keyed to shaft 14 and the polygonal configuration of portion 31 disposed within boss 46, the plate 38 is caused to rotate with shaft 14 and thereby impart rotational movement to blade 20 by virtue of the fact that clutch plate 58 is in engagement with plate 38 through friction member 68.

However, if control handle 122 is released for any reason whatsoever and while shaft 14 continues to rotate, control handle 122 automatically moves toward the outermost end of guide 124 under the influence of cable 116 within housing 118 and which is in turn reciprocated by lever 88 swinging about the horizontal axis of pivot pin 92 because of the action of spring 85 biasing the latter downwardly. Swinging movement of lever 88 to the dotted line position shown in Fig. 2 operates to move control bolt 84 downwardly by virtue of shifting of pin 100 downwardly and therefore, arm 74 is permitted to swing about the pivot point on bracket 76 under the urging of spring 85. This moves the legs 80 of arm 74 upwardly along shaft 14 and permits plate 38 to move away from plate 58 under the action of spring 70. As the legs 80 of arm 74 move upwardly along shaft 14, arm 104 is moved downwardly about its pivot point on skirt 18 to a position with brake shoe 112 engaging margin 64 of plate 58. The link 114 between arm 74 and bight 110 of arm 104 moves brake arm 104 downwardly under the action of spring 85 as lever 88 is swung to the dotted line position illustrated in Fig. 2. It is thus apparent that upon engagement of brake shoe 112 with margin 64 of plate 58, blade 20 is prevented from rotating while shaft 14, collar 30, plate 38, washers 56 and 50, and bolt 24 continue to turn under the influence of engine 12.

In order to assure that lever 88 will always be swung downwardly under the influence of spring 85 whenever handle 122 is released, it is preferable to provide an adjusting screw 126 on bracket 92 which prevents lever 88 from assuming an over center position. Also, by virtue of the provision of nut 102 which is shiftable on bolt 84, the tension or force which is exerted on plate 38 may be varied to allow for wear on member 68 and thereby prevent slippage between clutch plates 38 and 58 during operation of blade 20.

Although the brake and clutch mechanism illustrated in Figs. 1 to 4 of the drawing are satisfactory for most purposes, a preferred modified form of the instant invention is illustrated in Figs. 5 to 8 inclusive, wherein many of the components are identical with those described with respect to the mechanism of Figs. 1 to 4 and thus, will not be recited again in the description of the modified form. Housing 210 of the mowing machine shown in Figs. 5 to 8 inclusive mounts an engine 212 and is provided with a central opening 216 clearing the drive shaft 214 of engine 212 which extends downwardly from housing 210 and is disposed vertically.

Means for releasably securing mowing blade 220 shown fragmentarily in Fig. 5 to shaft 214 is identical with the mechanism shown and described in Fig. 2 and thus, it need only be pointed out that clutch structure 228 includes a pair of opposed clutch plates 238 and 258 which are frusto-conical in configuration and are disposed in surrounding relationship to shaft 214. As previously indicated, a collar 230 is secured to shaft 214 in axial relationship thereto by bolt means 224 and blade 220 is positioned between a pair of bearings 252 and 254 disposed between a washer 256 and a frusto-conical thrust washer 250. A coil spring 270 surrounding tubular boss 246 on upper clutch plate 238 normally biases the latter away from lower clutch plate 258.

Clutch plate 258 is of greater diameter than upper clutch plate 238 so as to present an outer peripheral margin 264 which is annular in configuration and an annular disc member 268 of friction material provides anti-slippage engagement between clutch plates 238 and 258.

An annular brake arm 274 is disposed in surrounding relationship to upper cltuch plate 238 and has an annular brake shoe 213 secured to the lower face thereof in a position to engage peripheral margin 264 of lower clutch plate 258.

Means for shifting brake shoe 213 into engagement with margin 264 of lower clutch plate 258 includes an elongated shifter arm 275 pivotally mounted intermediate its ends on a bracket 276 carried by the lower face of housing 210, and it has to be pointed out that the end of shifter arm 275 adjacent drive shaft 214 is forked to present a pair of opposed legs 280 clearing shaft 214 and engaging a pressure bearing 272 disposed in surrounding relationship and engaging the upper portion of clutch plate 238.

The end of arm 275 opposed to shaft 214 is connected with mechanism for pivoting arm 275 about its mounting on bracket 276 in the same manner as that described with respect to the form of the invention illustrated in Fig. 2. In particular, it is noted that coil spring 285 surrounding bolt 284 passing through the end of arm 275, normally biases such end of arm 275 downwardly upon swinging movement of lever 288 about its horizontal axis.

The mechanism for shifting brake shoe 213 into frictional engagement with margin 264 of clutch element 258 includes linkage comprising a substantially U-shaped rod broadly designated 326 having a bight 328 rotatably carried by bracket 276 above arm 275 and by another substantially U-shaped bracket 330 adjacent housing 210. It is to be noted that bight 328 is disposed substantially horizontal with respect to and adjacent vertical drive shaft 214. A lateral extending leg 332 on one end of bight 328 is disposed adjacent an extension 333 integral with and lying in the plane of brake arm 274, while another leg 334 joined to bight 328 at the end thereof opposite from leg 332 extends laterally from bight 328 in substantial parallelism with leg 332. However, by providing a separate leg 334, assembly of the mechanism is facilitated inasmuch as it is only necessary to provide suitable openings in brackets 276 and 330 for clearing bight 328 of rod 326, whereupon such bight may be passed through the openings and then leg 334 suitably secured to the outer end thereof.

An upright ear 336 rigidly joined to the upper face of arm 274 adjacent bracket 276 pivotally receives the outermost end of leg 332 away from bight 328 by virtue of a relatively large opening (not shown) receiving leg 332.

As noted in Figs. 5 and 7, U-shaped bracket 330 has a lower plate portion 338 extending laterally away from drive shaft 214 and mounts a pair of depending guides 340 disposed in horizontally spaced relationship and reciprocally received within corresponding perforations (not shown) in a laterally extending extension 342 integral with and lying in the plane of brake arm 274 in opposed relationship to extension 333.

An upright bar 344 is pivotally connected to the outermost end of leg 334 and extends downwardly therefrom through a perforation 346 in plate portion 338 of bracket 330 and through extension 333 of brake arm 274. An annular stop 348 rigidly secured to bar 344 in surrounding relationship thereto is disposed above extension 342 of brake arm 274 in a position to engage extension 342 upon reciprocation of bar 344.

A spring 350 secured at opposite ends thereof to bight 328 of rod 326 and to an ear 352 on the upper face of brake arm 274 maintains brake shoe 213 out of engagement with peripheral margin 264 of clutch plate 258 until extension 342 of brake arm 274 is moved downwardly under the influence of stop 348 on bar 344.

Extension 333 of brake arm 274 is pivotally connected to shifter arm 275 by an intermediate link 314 so that upon swinging movement of shifter arm 275 about its pivotal mount on bracket 276, extension 333 of brake arm 274 moves therewith.

A shield broadly designated 353 is mounted beneath housing 210 for protecting the mechanical components described above from loose clippings and other foreign materials and is preferably constructed of a pair of sections 354 and 356 which are identical with the exception of one being the reverse of the other. As most clearly shown in Fig. 6, each of the sections 354 and 356 has a semi-cylindrical portion 358 adapted to be disposed in surrounding relationship to the clutch and brake mechanism, as well as a laterally extending portion 360 adapted to house the outer end of shifter arm 275 and the mechanism for swinging the same. Each of the semi-cylindrical portions 358 is provided with a semicircular opening 362 for clearing the portion of lower clutch plate 258 securing blade 220 to the same. A plurality of laterally extending perforated ears 364 are provided on the marginal edges of sections 354 and 356 permitting the shield 353 to be secured to the underface of housing 210 by bolt means 366.

The operation of the mowing machine illustrated in Figs. 5 to 8 inclusive is identical with that of the movement of brake arm 274. It can be seen that upon release of the handle controlling swinging movement of lever 288, spring 285 biases the adjacent end of shifter arm 275 downwardly because of the off-center mounting of lever 288 and thereby causes shifter arm 275 to be swung about the pivotal mount on bracket 276. As legs 280 of shifter arm 275 move upwardly, coil spring 270 biases upper clutch plate 238 away from clutch plate 258 to disconnect the power coupling between clutch plates 238 and 258.

Coincidental with release of clutch plate 238 from clutch plate 258, link 314 pivotally connecting shifter arm 275 with extension 333 of brake arm 274 is moved downwardly to thereby cause the area of brake shoe 213 adjacent extension 333 to move into engagement with the proximal marginal area 264 of clutch plate 258. Also, simultaneously therewith, downward swinging movement of the end of shifter arm 275 adjacent coil spring 285 causes ear 336 to be moved downwardly to thereby swing leg 332 of rod 326 therewith. Swinging movement of leg 332 through a pre-defined arc causes bight 328 of rod 326 to be rotated on its longitudinal axis and thus leg 334 rigidly secured to the end of bight 328 is rotated therewith. Swinging movement of rod 334 through an arc identical with that of leg 332, causes bar 344 to be moved downwardly in a vertical line because of the limiting relationship of perforation 346 in plate portion 338 of bracket 330, thereby forcing extension 342 of brake arm 274 downwardly as stop 348 engages extension 342.

It can now be ascertained that because of the parallel linkage arrangement presented by U-shaped rod 326 and the bar 344 depending therefrom, opposed areas of brake shoe 213 are simultaneously and uniformly moved into engagement with peripheral margin 264 of lower clutch plate 258 immediately and automatically upon release of clutch plate 238 from clutch plate 258.

Furthermore, shield 353 serves the important function of preventing loose clippings produced by cutter blade 220 from entering the clutch and brake mechanism described herein, and protects all of the mechanical components of the mowing machine.

This application is a continuation in part of my application Serial No. 694,166 filed November 4, 1957 and entitled Clutch and Brake Mechanism for a Rotary-type mowing machine, now abandoned.

Having thus described the invention what is claimed as new and desired to be secured by Letters Patent is:

1. In a rotary-type mowing machine, a drive shaft; a blade; structure releasably coupling said blade to the shaft for rotation therewith, said structure including a pair of interengageable, relatively shiftable clutch elements and spring means interposed between said elements for biasing the same relatively away from each other, one of said elements being operably connected to said shaft and the other element being coupled to said blade; and brake means cooperable with said structure and engageable with said other element for automatically preventing rotation of the blade upon relative shifting movement of the elements away from each other to thereby effect uncoupling of the blade from the shaft.

2. In a rotary-type mowing machine, a drive shaft; a blade; structure releasably coupling said blade to the shaft for rotation therewith, said structure including a pair of interengageable, relatively shiftable clutch elements and spring means interposed between said elements for biasing the same relatively away from each other, one of said elements being operably connected to said shaft and the other element being coupled to said blade; control mechanism engageable with said one element for shifting the latter into engagement with said other element; and brake means cooperable with said mechanism and engageable with said other element for automatically preventing rotation of the blade upon movement of the mechanism away from said one element to permit the latter to move away from said other element whereby the blade is uncoupled from the shaft.

3. In a rotary-type mowing machine, a drive shaft; a blade; structure releasably coupling said blade to the shaft for rotation therewith, said structure including a pair of interengageable, relatively shiftable clutch elements and spring means interposed between said elements for biasing the same relatively away from each other, one of said elements being operably connected to said shaft and the other element being coupled to said blade and provided with a peripheral margin extending outwardly beyond the periphery of said one element; control mechanism engageable with said one element for shifting the latter into engagement with said other element; and means cooperable with said mechanism and including a brake engageable with said margin on said other element for automatically preventing rotation of the blade upon movement of the mechanism away from said one element to permit the latter to move away from said other element whereby the blade is uncoupled from the shaft.

4. In a rotary-type mowing machine, a drive shaft; a blade; structure releasably coupling said blade to the shaft for rotation therewith, said structure including a pair of interengageable, relatively shiftable clutch elements and spring means interposed between said elements for biasing the same relatively away from each other, one of said elements being operably connected to said shaft and the other element being coupled to said blade and provided with a peripheral margin extending outwardly beyond the periphery of said one element; control mechanism engageable with said one element for shifting the latter into engagement with said other element; a brake arm adapted to be swingably mounted on said machine and including a brake shoe engageable with said margin on said other element; and linkage pivotally interconnecting said arm and said mechanism for automatically moving said shoe into engagement with said margin upon movement of the mechanism away from said one element to permit the latter to move away from said other element whereby the blade is uncoupled from the shaft.

5. A mowing machine as set forth in claim 4 wherein is provided parts connected with said control mechanism normally biasing the latter out of engagement with said one element.

6. A mowing machine as set forth in claim 5 wherein is provided a lever adapted to be swingably mounted on the machine and pivotally connected to said parts for moving the latter upon swinging of the lever to thereby swing the mechanism to a position engaging said one element.

7. A mowing machine as set forth in claim 6 wherein is provided an elongated cable connected with said lever for swinging the latter from a location remote from the parts.

8. A mowing machine as set forth in claim 7 wherein is provided spring means normally biasing said lever into a position whereby said parts are shifted to a location swinging the mechanism away from said one element.

9. A mowing machine as set forth in claim 5 wherein is provided a hollow shield adapted to be mounted on the machine in surrounding relationship to said structure, drive shaft, control mechanism, brake arm and parts in a position to protect the same from loose clippings and foreign material.

10. In a rotary-type mowing machine provided with a housing, a drive shaft; a blade; structure releasably coupling said blade to the shaft for rotation therewith, said structure including a pair of interengageable, relatively shiftable clutch elements and spring means interposed between said elements for biasing the same relatively away from each other, one of said elements being operably connected to said shaft and the other element being coupled to said blade and provided with a peripheral margin extending outwardly beyond the periphery of said one element; an elongated shifter arm adapted to be swingably mounted on the housing and engageable with said one element for shifting the latter into engagement with said other element; a brake arm having a brake shoe engageable with the entire periphery of said margin on said other element; and linkage adapted to be pivotally carried by the housing and said shifter arm and connected to said brake arm for immediately and automatically moving the brake shoe into uniform peripheral engagement with said margin on said other element when the shifter arm is swung in a direction permitting said elements to move relatively away from each other whereby the blade is uncoupled from the shaft.

11. A mowing machine as set forth in claim 10 wherein said linkage includes a link member pivotally interconnecting the shifter arm and said brake arm for shifting one portion of the brake band into engagement with said margin of said other element, a U-shaped rod provided with a pair of spaced legs and a bight, said bight being adapted to be rotatably mounted on the housing in horizontal overlying relationship to said brake arm and said legs thereof being disposed adjacent opposed peripheral portions of the brake arm, ear means secured to the shifter arm adjacent a proximal leg of the rod and pivotally connected to the outer end of said proximal leg and a bar pivotally connected to the outer end of the opposite leg of the bar and engaging the brake arm for shifting the proximal portion of said brake shoe into engagement with said margin on said one element whereby upon swinging of said shifter arm in said direction, said link member and the bar immediately and automatically move the brake shoe into uniform, circumferentially extending engagement with said margin of said one element as said rod is rotated about the axis of said bight thereof.

References Cited in the file of this patent

UNITED STATES PATENTS

| | | |
|---|---|---|
| 1,981,501 | Geldhof | Nov. 20, 1934 |
| 2,471,367 | Cavaness | May 24, 1949 |
| 2,660,278 | Landwier | Nov. 24, 1953 |
| 2,742,750 | Funk | Apr. 24, 1956 |
| 2,803,103 | Kollman | Aug. 20, 1957 |
| 2,838,901 | Davis | June 17, 1958 |